United States Patent
Nagarajappa

(10) Patent No.: US 9,360,577 B2
(45) Date of Patent: Jun. 7, 2016

(54) METHOD AND APPARATUS FOR PROCESSING SEISMIC DATA

(71) Applicant: CGGVERITAS SERVICES SA, Massy (FR)

(72) Inventor: Nirupama Nagarajappa, Calgary (CA)

(73) Assignee: CGG SERVICES SA, Massy (FR)

( * ) Notice: Subject to any disclaimer, the term of this patent is extended or adjusted under 35 U.S.C. 154(b) by 581 days.

(21) Appl. No.: 13/692,313

(22) Filed: Dec. 3, 2012

(65) Prior Publication Data

US 2013/0194893 A1    Aug. 1, 2013

Related U.S. Application Data

(60) Provisional application No. 61/592,653, filed on Jan. 31, 2012.

(51) Int. Cl.
*G01V 1/36* (2006.01)
*G01V 1/28* (2006.01)

(52) U.S. Cl.
CPC . *G01V 1/364* (2013.01); *G01V 1/28* (2013.01); *G01V 2210/3246* (2013.01)

(58) Field of Classification Search
CPC ........... G01V 1/364; G01V 1/28; G01V 1/36; G01V 2210/3246
USPC ........................ 367/38, 43, 45, 56, 58; 702/17
See application file for complete search history.

(56) References Cited

U.S. PATENT DOCUMENTS

2001/0000216 A1 *  4/2001  Kober et al. .................. 341/155

FOREIGN PATENT DOCUMENTS

| CN | 101382598 B | * | 4/2011 |
| GB | 1503186 A | | 3/1978 |
| WO | 00/00843 A1 | | 1/2000 |
| WO | 2010/088190 A2 | | 8/2010 |

OTHER PUBLICATIONS

James A. Cadzow, "Signal Enhancement—A Composite Property Mapping Algorithm", IEEE Transactions on Acoustics, Speech and Signal Processing, vol. 36, No. 1, Jan. 1988, pp. 49-62.
Stephen K. Chiu et al., "Attenuation of Coherent Noise Using Localized-adaptive Eigenimage Filter", Society of Exploration Geophysicists, 2008 SEG Annual Meeting, Nov. 9-14, 2008, Las Vegas, Nevada, pp. 2541-2545.
Stephen K. Chiu, "F-xy Noise Attenuation Via Multichannel Singular Spectrum Analysis in Randomized Domain", Society of Exploration Geophysicists, 2011 SEG Annual Meeting, Sep. 18-23, 2011, San Antonio, Texas, pp. 3612-3616.

(Continued)

*Primary Examiner* — Ian J Lobo
(74) *Attorney, Agent, or Firm* — Patent Portfolio Builders PLLC

(57) ABSTRACT

Methods and apparatuses for processing seismic data carrying information about a subsurface structure are provided. One method includes splitting the seismic data in groups, each group including subsets of seismic data for which a distance from a respective shot point to a receiver line in a patch of active detectors corresponding to the shot point is within a predetermined range for the group, and extracting signal data for each block Hankel matrix based on an SVD analysis thereof. Another method includes extracting signal data by subtracting from seismic data an estimated noise model obtained by rank reduction of a Hankel matrix followed by dip filtering, enhanced based on a least square matching filter with the seismic data.

20 Claims, 13 Drawing Sheets

(56) References Cited

OTHER PUBLICATIONS

David Le Meur et al., "Adaptive Noise Attenuation" Society of Exploration Geophysicists, 2008 SEG Annual Meeting, Nov. 9-14, 2008, Las Vegas, Nevada, pp. 3667-3670.

M. Naghizadeh et al., "De-aliased Cadzow Reconstruction" GeoConvention 2012:Vision May 11-14, 2012, pp. 1-4.

Vicente E. Oropeza et al., "Multifrequency Singular Spectrum Analysis", Society of Exploration Geophysicists, 2009 SEG Annual Meeting, Oct. 25-30, 2009, Houston, Texas, pp. 3193-3197.

Vicente E. Oropeza et al., "Application of Singular Spectrum Analysis to Ground Roll Attenuation", GeoCoanada May 10-14, 2010, pp. 1-5.

Stewart Trickett et al., F-xy Cadzow Noise Suppression 2008 SEG Annual Meeting, Nov. 9-14, 2008, Las Vegas, Nevada, pp. 2586-2589.

Vladimir Rokhlin et al., "A Randomized Algorithm for Principal Component Analysis" SIAM Journal on Matrix Analysis and Applications, vol. 31 No. 3, Jul. 5, 2009, pp. 1100-1124.

D. Waltham, "Plane-Wave Constraints in 2D Filter Design" Geophysical Prospecting vol. 40, Issue 3, Apr. 1992, pp. 343-358.

UK Search Report mailed Mar. 5, 2014, in related British Application No. GB1301190.3.

V. Oropeza et al., "Simultaneous Seismic Data Denoising and Reconstruction via Multichannel Singular Spectrum Analysis", Geophysics, May-Jun. 2011, pp. V25-V32, vol. 76, No. 3.

UK Search Report mailed Jul. 11, 2013, in related British Application No. GB1301190.3.

* cited by examiner

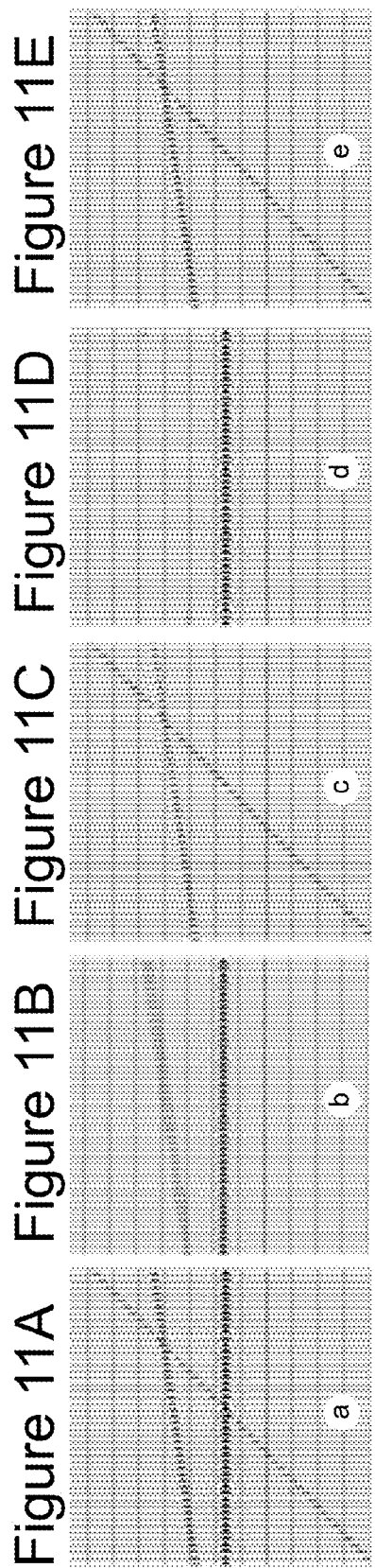

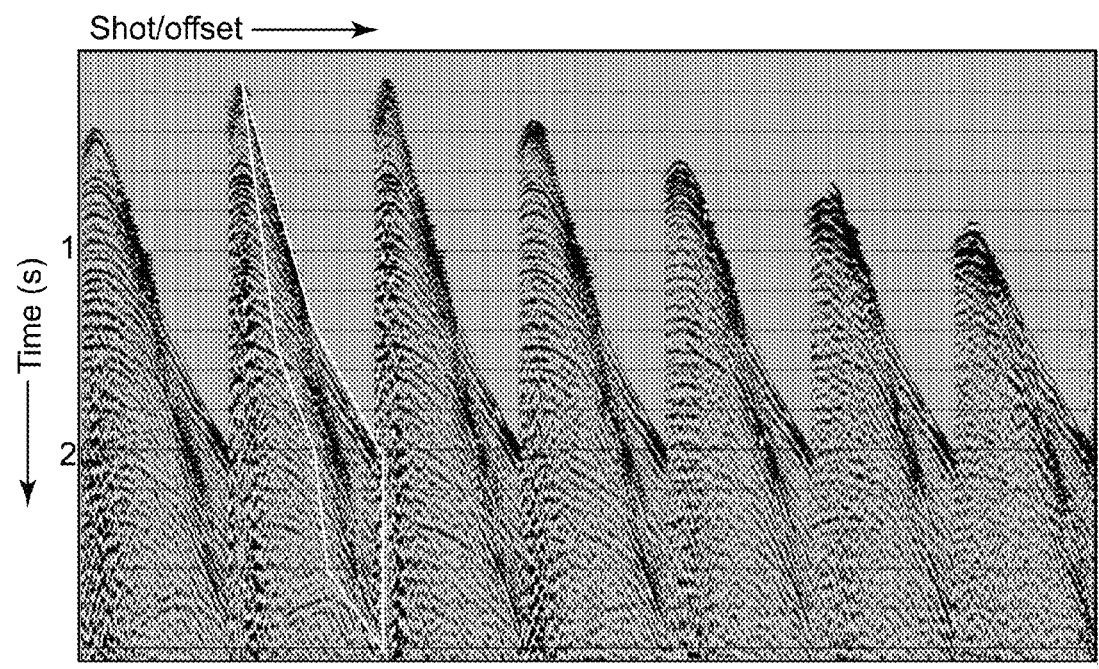

METHOD AND APPARATUS FOR PROCESSING SEISMIC DATA

BACKGROUND

1. Technical Field

Embodiments of the subject matter disclosed herein generally relate to methods and apparatuses for processing seismic data, more particularly, to adaptive rank reduction methods for attenuating (subtracting) the noise in recorded seismic data.

2. Discussion of the Background

During the past years, the interest in developing new oil and gas production fields on land and offshore has continued to increase. Therefore, geophysical surveys have become more sophisticated in order to more accurately decide where to drill to avoid a dry well. The term "geophysical survey" refers to a systematic collection of geophysical data using various techniques. The data may be collected from above, on or below the Earth's surface and the sea surface. Seismic methods (such as reflection seismology and seismic tomography) are the most frequently used techniques in geophysical surveys due to their efficiency in terms of penetration depth, relatively reduced cost and low environmental impact.

A seismic survey involves deploying one or more seismic sources and seismic detectors at predetermined locations. The seismic sources generate pressure (seismic) waves, which propagate into the geological formations. A seismic source generating a seismic wave is known as a "shot." Changes in acoustic properties of the geological formation scatter the seismic waves, changing their direction of propagation and other properties. Part of the energy emitted by the seismic sources is reflected inside the geological formation and reaches the seismic detectors to produce seismic data.

In a land data acquisition system, the detectors may be arranged along receiver lines, while the seismic sources are usually positioned at shot points in-between the receiver lines on shot lines parallel to the receiver lines as the land topography allows.

The recorded seismic data corresponds to signals (due to seismic wave reflections inside the geological formation) and to overlapping noise. The seismic data includes values proportional to pressure versus time or to displacement versus time as sensed by seismic detectors (e.g., hydrophones and geophones), associated with the corresponding positions of the detectors and of the shot point.

The seismic data processing yields a profile (image) of the geophysical structure (subsurface). While this profile does not provide an accurate location for the oil and gas reservoirs, it suggests, to those trained in the field, the presence or absence of oil and/or gas reservoirs.

The seismic data may suffer from high levels of noise, making the task of processing and interpreting the data difficult. The noise may be random (i.e., uncorrelated with the shot) or coherent (i.e., correlated with the shot or the detector). The removal (attenuation) of random noise normally relies on the fact that random noise is not predictable (e.g., non-orthogonal) relative to the shot. When the data is altered (e.g., for removing the noise), it is desirable to preserve the amplitude versus offset (AVO) behavior of the signal in order to obtain reliable subsurface information. In other words, since seismic data from plural detectors at various locations is assembled to generate an image of the subsurface, the manner in which corrections (such as noise removal) affect the data is desirable to be the same in terms of detector locations and shots. Land seismic data is often overwhelmed by coherent noise, which, if not removed, renders the extracted information unreliable.

The most common kind of coherent noise in land seismic data is the ground roll (or Rayleigh wave). Other types of coherent noise include air blast, flexure waves and near-surface reverberations. While the ground roll has very low frequency and velocity compared to reflection data, some noise types such as air blast or near-surface reverberations have a broader bandwidth (i.e., range of frequencies) and may have a higher velocity than the ground roll. In typical land acquisition geometries (i.e., arrangements of the seismic source(s) and the detectors), the noise is aliased spatially due to sparse geometries. The spatial and temporal variations of phase velocity versus frequency and the high amplitude variations of noise lead to a poor signal to noise ratio.

Some methods for removing noise (i.e., for noise attenuation) from seismic data use the velocity and frequency information to separate the noise and from the signal. While some methods can deal with aliased noise, approaches that in addition have the ability to deal with variable noise conditions are necessary.

When methods (such as, frequency and wave number—FK—fan filters) based on the assumption of regular detector spacing are used, smear artifacts occur in the subsurface image. Other methods (such as frequency and distance from the source—FX—fan filters) that are adaptive locally are effective in removing the orthogonal coherent noise and are able to handle irregular geometry, but are unable to adequately attenuate aliased noise. Recently have been developed methods that perform coherent noise attenuation based on an FX domain rank reduction. These methods provide the advantages of an FX filter and obtain a coherent noise model (including aliased noise), under the assumption that coherent noise is much stronger than the signal and that the coherent noise is orthogonal to the signal. However, in fact, the signal and the coherent noise are not orthogonal.

Accordingly, it would be desirable to provide rank reduction methods capable to separate strong non-orthogonal coherent noise from signal in land seismic data better than the conventional methods.

SUMMARY

Various embodiments provide the advantage of adaptively modeling coherent noise to achieve a better separation of the signal from strong coherent non-orthogonal noise (the noise being even larger than the signal), for land seismic data related to reflections of seismic waves in the subsurface. Some embodiments use a modified shot order to group the seismic data (which is an overlap of signal and noise). A block Hankel matrix rank reduction filtering method may additionally be used in order to adaptively model the noise, for each frequency. Some embodiments then use dip filtering and adaptively subtract the dip-filtered noise from the data to improve the coherent noise model and further remove the coherent noise. The dip-filtered estimated noise may be further improved by matching it to the seismic data using a least squares matching filter.

According to an exemplary embodiment, there is a method for processing, on a computer, seismic data carrying information about subsurface. The method includes receiving the seismic data recorded by detectors arranged on receiver lines, and splitting the seismic data into groups, each group including subsets of seismic data for which a distance from a shot point where a seismic wave is generated to a receiver line is within a predetermined range for the group. Further, the method includes extracting signal data by subtracting noise from the seismic data for each group of seismic data, and outputting the signal data useable to generate an image of the subsurface.

According to another exemplary embodiment, there is a method for processing seismic data carrying information about subsurface. The method includes generating a block Hankel matrix using a Fourier transform of the seismic data, performing a Singular Value Decomposition (SVD) of the block Hankel matrix, estimating noise assuming that coherent noise corresponds to largest singular values, and performing dip filtering to further separate signal leaked in estimated noise. The method further includes enhancing the dip-filtered estimated noise based on a least square matching filter with the seismic data. The method further includes extracting signal data by subtracting the enhanced dip-filtered estimated noise from the seismic data, the signal data being output or stored to be used for imaging the subsurface.

According to another exemplary embodiment an apparatus for processing seismic data carrying information about subsurface is provided. The apparatus has an interface configured to receive the seismic data and/or to transmit signal data. The apparatus has a data processing unit configured (A) to split the seismic data in groups, each group including subsets of seismic data for which a distance from a shot point where a seismic wave is generated to a receiver line is within a predetermined range for the group, (B) to extract signal data by subtracting noise from the seismic data for each group of seismic data, and (C) to output the signal data useable to generate an image of the subsurface.

According to another exemplary embodiment an apparatus for processing seismic data carrying information about subsurface is provided. The apparatus has an interface configured to receive the seismic data and/or to transmit signal data. The apparatus has a data processing unit configured (A) to generate a block Hankel matrix using a Fourier transform of the seismic data, (B) to perform a Singular Value Decomposition (SVD) of the block Hankel matrix, (C) to estimate noise assuming that coherent noise corresponds to largest singular values, (D) to perform dip filtering to further separate signal leaked in the estimated noise, (E) to enhance the dip-filtered estimated noise based on a least square matching filter relative to the seismic data, and (F) to extract the signal data using the enhanced estimated noise.

According to another exemplary embodiment, there is a computer-readable storage medium non-transitorily storing executable codes which, when executed on a computer, make the computer perform a method for processing seismic data carrying information about subsurface. The method includes splitting the seismic data into groups, each group including subsets of seismic data for which a distance from a shot point to a receiver line in a patch of active detectors corresponding to the respective shot point is within a predetermined range for the group. Further, the method includes extracting signal data by subtracting noise from the seismic data for each group of seismic data, and outputting the signal data useable to generate an image of the subsurface.

According to another exemplary embodiment, there is a computer-readable storage medium non-transitorily storing executable codes which, when executed on a computer, make the computer perform a method for processing seismic data carrying information about subsurface. The method includes generating a block Hankel matrix using a Fourier transform of the seismic data, performing a Singular Value Decomposition (SVD) of the block Hankel matrix, estimating noise assuming that coherent noise corresponds to largest singular values, and performing dip filtering to further separate signal leaked in estimated noise. The method further includes enhancing the estimated noise by matching the estimated noise to the data using a least squares matching filter. The method further includes extracting signal data by subtracting the enhanced estimated noise from the seismic data, the signal data is output or stored to be used for imaging the subsurface.

BRIEF DESCRIPTION OF THE DRAWINGS

The accompanying drawings, which are incorporated in and constitute a part of the specification, illustrate one or more embodiments and, together with the description, explain these embodiments. In the drawings:

FIGS. 11A, 11B, 11C, 11D and 11E are graphs used to illustrate results of applying a method according to an embodiment on simulated (synthetic) data;

FIGS. 12A, 12B and 12C are graphs used to illustrate results of processing real data using a method according to an exemplary embodiment;

DETAILED DESCRIPTION

Figure 1:
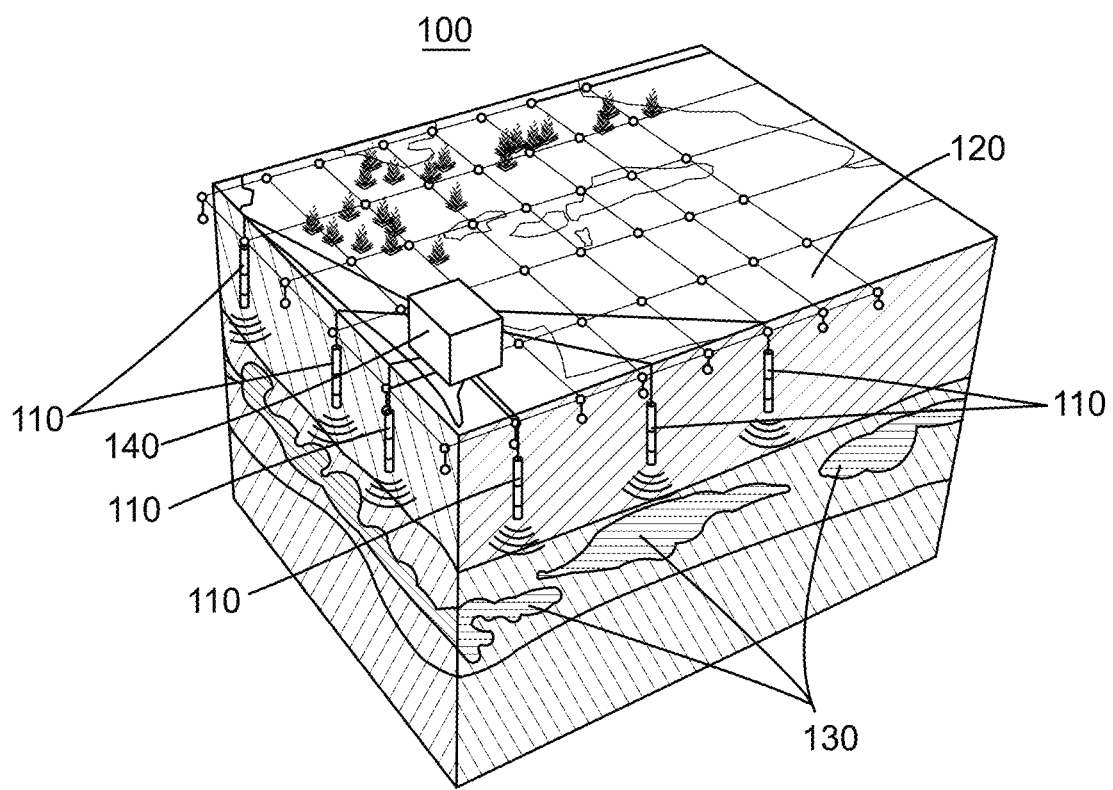
FIG. 1 is a schematic diagram of a land seismic survey system.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed using the terminology of seismic data processing using block Hankel matrices. However, the embodiments to be discussed next are not limited to seismic data, but may be applied to other similar sets of data in which noise is larger than and non-orthogonal to the signal.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

The reliability of seismic information extracted from seismic data depends on reliably separating the signal from noise (i.e., attenuating the noise). If signal is better separated from noise even if noise is non-orthogonal, the signal dips are better determined (signal and noise typically have different dips because they arrive to receivers at different velocities). In land data, noise is often strong and coherent noise is hard to separate from the signal, the noise dominating in certain areas and rendering the signal underneath unusable. Moreover, in typical land acquisition geometries, much of the noise is aliased spatially due to sparse geometries. The spatial and temporal variations of phase velocity versus frequency and the high amplitude variations of noise lead to a poor signal to noise ratio.

In order to remove the noise, methods according to various embodiments include ordering the seismic data by splitting the seismic data into groups, such that each of the groups includes subsets of the seismic data having a perpendicular distance from the shot point to a receiver line within a range specific for the group. The seismic data in each group is analyzed separately to extract the signal data by subtracting noise from the seismic data, thereby taking into consideration local characteristics of the noise.

In some embodiments, a Singular Value Decomposition (SVD) of the block Hankel matrix of the Fourier transform of the seismic data (the whole seismic data set or group-by-group) is used to estimate the noise. This noise estimation may be followed by performing dip filtering to further separate signal that has leaked into the estimated noise. The dip-filtered estimated noise may be further enhanced by applying a least square matching filter to the dip-filtered estimated noise and the seismic data. Signal data is extracted by subtracting noise from the seismic data. In case of a group-by-group approach the noise subtracted from the seismic data may be the estimated noise following an SVD analysis, the dip-filtered estimated noise. The best noise estimate is the enhanced dip-filtered noise estimate which is used for the whole seismic data set, but may also be used for the groups of seismic data.

A land seismic survey system 100 for acquiring seismic data is illustrated in FIG. 1. The survey system 100 includes one or more sources 110 and a grid of detectors 120 connected to a data processing unit 140. The grid of detectors 120 is often regular (i.e., the detectors are arranged at regular intervals along orthogonal directions), but may be arranged irregularly, and individual detectors may be located at different elevations from one another. While the detectors 120 are frequently kept at known positions for long periods, one or more seismic sources 110 may be relocated in different positions (shot points).

A seismic source at a predetermined location (shot point) generating seismic waves is known in the art as a shot. The shot is detected in some (not all) receivers, that is, the shot fires into its corresponding receiver lines. Specifically, for an individual shot point, a number of the receiver lines around its location can be configured to receive the signal (i.e., be kept active when the shots are fired from that individual shot point). Only the active receiver lines acquire seismic data. The number of receiver lines may be the same, but may also depend on the individual shot point location. A specific subset of receiver lines that are live (i.e., include active detectors) and are associated with a shot point is known as a "patch". The patch, which changes location with the shot point, may be defined by physical limitations (if some receiver lines are too far from the shot point, the signal is attenuated beyond being useful) or by deliberately limiting a zone of interest relative to a target location. Thus, seismic waves reflected after each shot are detected in receiver lines within the patch corresponding to the shot point. In other words, some of the available receiver lines are active to acquire data following a shot from an individual shot point, while others are not.

The seismic source(s) 110 in FIG. 1 are configured to generate seismic waves in the rock formation 130. The detectors 120 are configured to receive reflected seismic waves, convert them into electrical signals and generate the seismic data transmitted to the data processing unit 140. The data processing unit 140 is configured to process and/or store the seismic data comprising information on the reflected seismic waves. In order to simplify the problem, as an exemplary illustration and not as a limitation, the sources may also be arranged or moved in a regular manner (e.g., equal steps along shot lines) relative to the lines of detectors. The measurement system illustrated in FIG. 1 is exemplary and not intended to be limiting. For example, the detectors may be arranged differently, and or the shots points may be selected according to a different strategy depending on the terrain and the specific goals of the geophysical survey.

Figure 2:
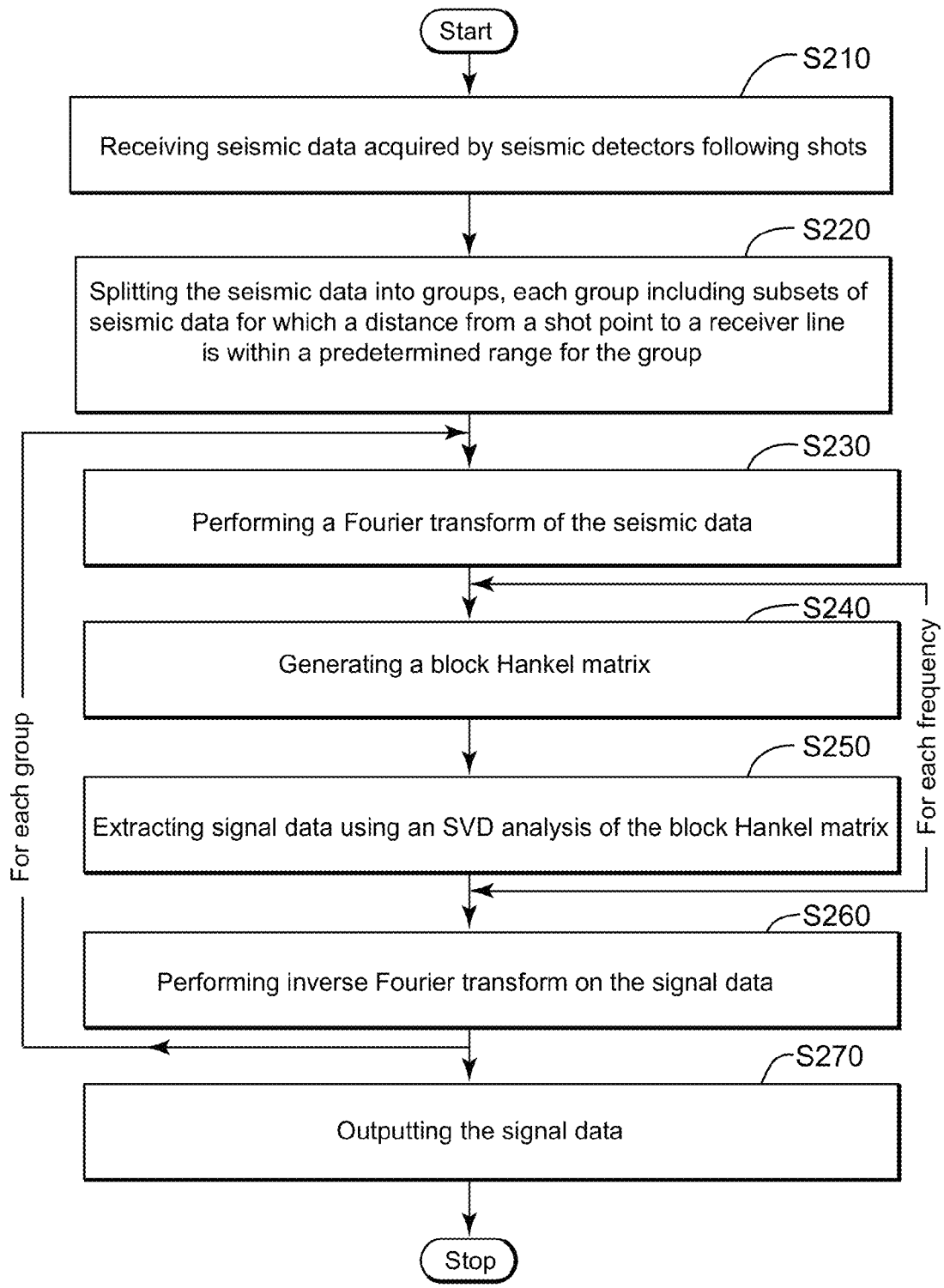
FIG. 2 is a flow chart of a method for seismic data processing, according to an exemplary embodiment.

The seismic data acquired using the measurement system 100 in FIG. 1 or other seismic survey systems may be processed using a method 200 (or alternatives thereof) whose flow chart in represented in FIG. 2. The method 200 includes inputting seismic data acquired by seismic detectors following shots, the seismic data including information on waves reflected from the subsurface, at S210. The method 200 further includes ordering the seismic data by splitting the seismic data into groups, each of the groups including subsets of seismic data having a distance y from (1) a shot point to (2) a receiver line (in a patch of active detectors corresponding to the shot point) within a range specific for the group, at S220. The groups include at least two groups: a first group for which the distance from the shot point to the receiver line is smaller than or equal to a threshold distance, and a second group for which the distance from the shot point to the receiver line is larger than the threshold distance.

The method 200 further includes extracting signal data by subtracting noise from the seismic data for each group of seismic data. Operations S230-S260 illustrate a non-limiting implementation of the extracting of the signal data group-by-group. Thus, the method 200 includes performing a Fourier transform (i.e., from time domain to frequency domain), at S230. The Fourier transform at S230 may be performed before or after S220.

The method 200 further includes, for each group and each frequency, generating a block Hankel matrix, at S240 and extracting signal data based on a SVD analysis of the block Hankel matrix, at S250. After performing an inverse Fourier transform on the extracted signal data, at S260, at step S270, the signal data is reassembled and output (or stored).

In the above description of the steps of method 200 it is assumed that the input seismic data is in time domain. However, the input seismic data may be in frequency domain, rendering step S230 unnecessary. Similarly, it is assumed that the output signal data is represented in time domain. However, the signal data may be output in frequency domain, rendering step S260 unnecessary. Some of the steps of method 200 are described in more detail below.

Figure 3:
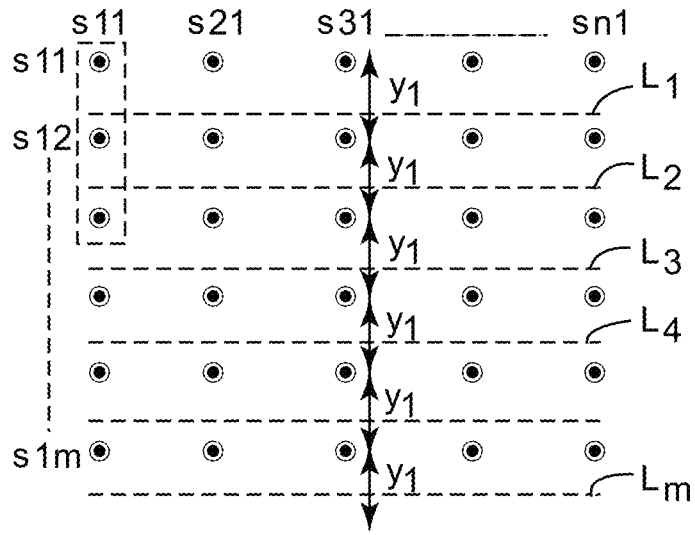
FIG. 3 illustrates a first group of seismic data, according to an exemplary embodiment.

FIG. 3 exemplarily illustrates a geometry for acquiring seismic data with a plurality of seismic source locations (i.e., shot points) $S_{ij}$ (i=1 to n and j=1 to m) and plural detectors arranged along the receiver lines $L_1$-$L_m$. If a single source point $S_{11}$ is fired, a detector $d_1$ will detect seismic data $SD(S_{11}, d_1)$, a detector $d_2$ will detect seismic data $SD(S_{11}, d_2)$ and so on. Thus, it is noted that the recorded seismic data depends on the location of the firing source and on the location of the detector. In FIG. 3, the shot points $S_{ij}$ are intercalated in-between the receiver lines $L_1$-$L_m$ such that the number of lines in the shot point matrix equals the number of receiver lines therein. However, this arrangement is merely an example and it is not intended to be a limitation; for example, the number of receiver lines does not have to be the same as the number of lines of the shot point matrix.

A first group of seismic data includes the data collected from receiver lines located at a distance no farther than $y_1$ (i.e., $+/-y_1$) from respective shot points. If the shot points are located along shot lines, the first group includes the seismic data corresponding to shots points $S_{i1}$ (where i=1 to n), which seismic data is detected by detectors located along the receiver line $L_1$. Also, the first group includes seismic data corresponding to shot points $S_{i2}$ (where i=1 to n), which seismic data is detected by detectors located along the line $L_2$, and so on. Although for simplicity a distance $y_1$ from shot points towards an upper side of FIG. 3 is not shown, in fact, the first group may also include receiver lines on an opposite side of the shot points (in FIG. 3, above the locations of the respective shot points), if these opposite-side receiver lines have a perpendicular distance to a respective shot point less than $y_1$.

Figure 4:
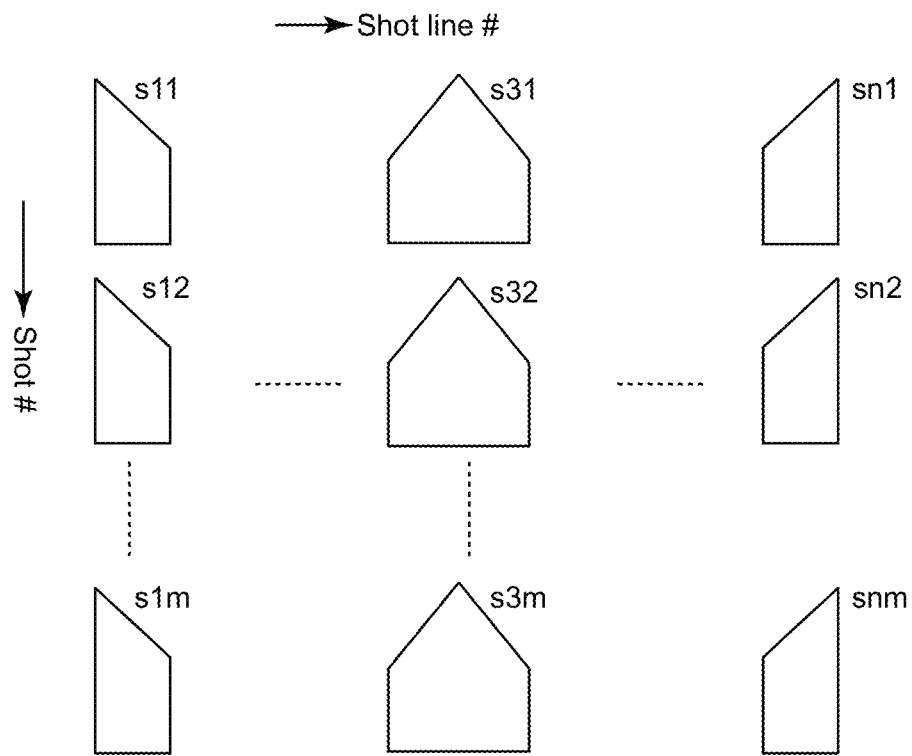
FIG. 4 illustrates shot profiles for the first group of seismic data, according to an exemplary embodiment.

The shot profiles for data in this first group are illustrated in FIG. 4. That is, a shot profile sij in FIG. 4 corresponds to data gathered after a shot was fired at the location sij in FIG. 3. A shot profile sij in FIG. 4 illustrates first break (i.e., first arrival time) for the shortest offset plane (i.e., closest receiver line), which data belongs to the first group. The horizontal axis for each shot profile represents detection locations along the receiver line, and the vertical axis is time (i.e., first arrival time). In this first group, since the shots points are close to receiver lines, the first arrival time versus location has a profile that appears linear.

Figure 5:
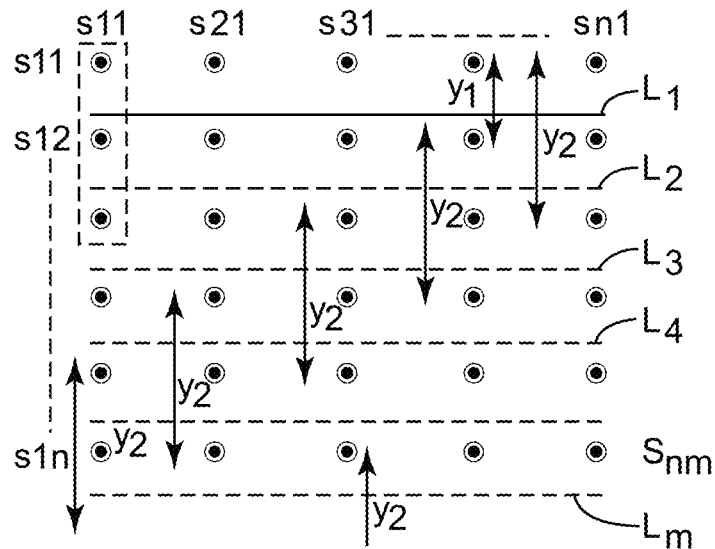
FIG. 5 illustrates a second group of seismic data, according to an exemplary embodiment.
Figure 6:
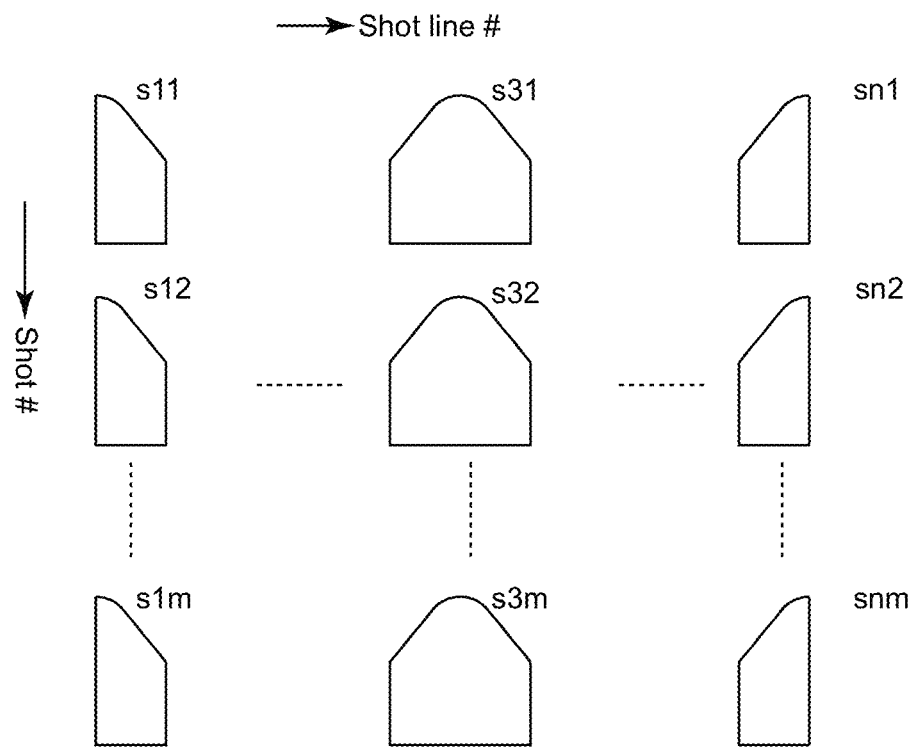
FIG. 6 illustrates shot profiles for the second group of seismic data, according to an exemplary embodiment.

Similar to FIG. 3, FIG. 5 illustrates a second group of seismic data that includes the seismic data gathered from detectors on a receiver line at a perpendicular distance y from a respective shot point larger than $y_1$ but smaller than $y_2$. There may be two receiver lines on different sides of the shot point within this second group. The shot points being located along shot lines in FIG. 5, the second group includes the seismic data corresponding to shots $S_{i1}$ (where i=1 to n) detected by detectors located along the line $L_2$, together with the seismic data corresponding to shots $S_{i2}$ (where i=1 to n) detected by detectors located along the receiver line $L_3$, and so on (i.e., the seismic data corresponding to shots $S_{ik}$ detected by detectors located along the line $L_{k+1}$ where k≥3). However, the second group may also include data acquired by detectors along receiver lines on the opposite side of the shot point. That is, the second group may also include the data corresponding to shots $S_{i2}$ acquired by detectors located along the receiver lines $L_1$, and the data corresponding to shots points $S_{ik}$ acquired by detectors located along the receiver lines $L_{k-1}$ where k≥2). The shot profiles (absolute values or only positive) for data in this second group are illustrated in FIG. 6. Since the detectors are now farther from the shot point than it was the case in the first group, the shot profiles appear parabolic.

Extracting the signals data by subtracting noise from the seismic data as in steps S230-S240 is then performed for each group of seismic data. Although steps S230-S260 may be performed for the whole set of seismic data, grouping the seismic data enables taking into consideration localized effects of the noise, and therefore extracting the noise from the seismic data yields better results than without grouping.

The seismic data processing may use the data in frequency domain. Thus, a Fourier transform is applied to all traces of the data to convert the data to the frequency domain, at S230. Once the data is transformed in frequency domain, at S240, a Hankel matrix is built for each frequency as explained below.

Intuitively, seismic data has at least three dimensions, i.e., x and y (for in plane position of the detector relative to the source) and time. If detectors are placed along receiver lines, it is convenient to choose one axis (e.g., x-axis) to be along the receiver lines and the other axis (e.g., y-axis) to be perpendicular to the receiver lines. However, the seismic data may comprise sets of more than three values (one of which is time). For example, a seismic data set may be represented as a 5-dimensional volume: two spatial dimensions to identify the source location, two more to identify the receiver location, and a fifth dimension, which is time. Another way of representing the data as a 5-dimensional volume is by identifying the two dimensions of the source-receiver midpoint location, the source-receiver distance (offset) and the azimuth of arrival as the third and fourth dimension, and finally time as the fifth dimension. The information contained by each of these dimensions can be utilized simultaneously via a block Hankel matrix.

A set of 3D data including Nx by Ny by Nt samples $d_{kij}$ (where index k is used for offset traces, index i is used for shot position and index j is used for the time samples) may first be transformed in frequency domain $\hat{d}_{kij}$ and then for each frequency j, at a given shot point i, a Hankel matrix $M_i$ is constructed from the Nx offset traces $$M_i = \begin{bmatrix} \hat{d}_{1,i} & \hat{d}_{2,i} & \hat{d}_{3,i} & \ldots & \hat{d}_{Nx-Lx+1,i} \\ \hat{d}_{2,i} & \hat{d}_{3,i} & \hat{d}_{4,i} & \ldots & \hat{d}_{Nx-Lx+2,i} \\ \vdots & \vdots & \vdots & & \vdots \\ \vdots & \vdots & \vdots & & \vdots \\ \hat{d}_{Lx,i} & \hat{d}_{Lx+1,i} & \hat{d}_{Lx+2,i} & \ldots & \hat{d}_{Nx,i} \end{bmatrix} \quad (1)$$

where $\hat{d}_{k,i}$ denotes the complex value at a given frequency, for shot point i, offset k and Lx is Nx/2 for a square matrix. If the data were 2D data a rank reduction would then be performed. For 3D data, a block Hankel matrix is then built $$M_{xy} = \begin{bmatrix} M_1 & M_2 & M_3 & \ldots & M_{Ny-Ly+1} \\ M_2 & M_3 & M_4 & \ldots & M_{Ny-Ly+2} \\ \vdots & \vdots & \vdots & & \vdots \\ \vdots & \vdots & \vdots & & \vdots \\ M_{Ly} & M_{Ly+1} & M_{Ly+2} & \ldots & M_{Ny-Ly} \end{bmatrix} \quad (2)$$

where $M_{xy}$ is a 2D block Hankel matrix, $M_1$ and $M_{Ny}$ are Hankel matrices for Ny shot points and Ly is Ny/2 for a square matrix. After rank reduction (a lower rank approximation of the matrix), the filtered data are recovered by averaging along the appropriate diagonals of the matrix $M_i$ or $M_{xy}$.

When performing the SVD analysis, if there are n dips in the square Hankel matrix, then n eigen images (i.e., rank n) are kept because there are n independent columns. However, each of the eigen images may or may not represent a separate dip, as described below. Rank reduction is not sufficient to separate noise dips.

To analyze the separation of noise from the signal, the block Hankel matrix H (i.e., $M_i$ or $M_{xy}$) obtained from the data may be modeled as a sum of Hankel matrices corresponding to the signal S, the coherent noise $N_c$ and the random noise $N_r$ for a given frequency:

$$H = S + N_c + N_r. \quad (3)$$

Upon applying SVD, the Hankel matrix H can be written as $$H = U\Sigma V^H \quad (4)$$

where U, $\Sigma$, and V (the superscript $^H$ denotes Hermitian conjugate) are the left singular, singular value and right singular matrices, respectively. A fast randomized SVD may be used. Then, since $V^H V = U^H U = I$, $$HH^H = (S + N_c + N_r)(S + N_c + N_r)^H = U\Sigma V^H V \Sigma U^H = U\Sigma^2 U^H \quad (5)$$

By expanding formula (5), one obtains:

$$HH^H = SS^H + SN_c^H + N_c S^H + N_c N_c^H + \sigma^2 I \quad (6)$$

where $\sigma^2$ is the variance of the random noise $N_r$.

If $\|N_c\| \gg \|S\| \gg \|N_r\|$, then $\mathrm{Tr}\{N_c N_c^H\} \gg 2\ \mathrm{Tr}\{SN_c^H\} \gg \mathrm{Tr}\{SS^H\} \gg \mathrm{Tr}\{\sigma^2 I\}$, where $\|\ \|$ indicates norm and $\mathrm{Tr}\{\ \}$ indicates a trace of the matrix. Therefore, the trace of random noise is the smallest and the corresponding left singular vector is orthogonal to the remaining terms of the right-hand side of equation (6). Thus, a rank reduction of the matrix H such that the rank is n where n is the number of independent dips can separate (remove) the random noise.

Further, since the sum of the eigenvalues corresponding to the coherent noise are much larger than the sum of the eigenvalues corresponding to the signal, reducing the rank of H to the number of coherent noise dips yields a coherent noise estimate. The estimated noise (hereinafter the term "noise" would actually refer to coherent noise) may be used, in a first approximation, to extract the signal data by subtracting the estimated noise from the seismic data.

However, this first approximation does not result in a complete separation of the signal and coherent noise because of the presence of cross-terms $SN_c^H$ and $N_c S^H$. The presence of the cross-terms shows that there is residual overlap of signal and non-orthogonal coherent noise. Thus, an adaptive approach following rank reduction is necessary to remove the residual signal from the estimated noise.

Figure 7:
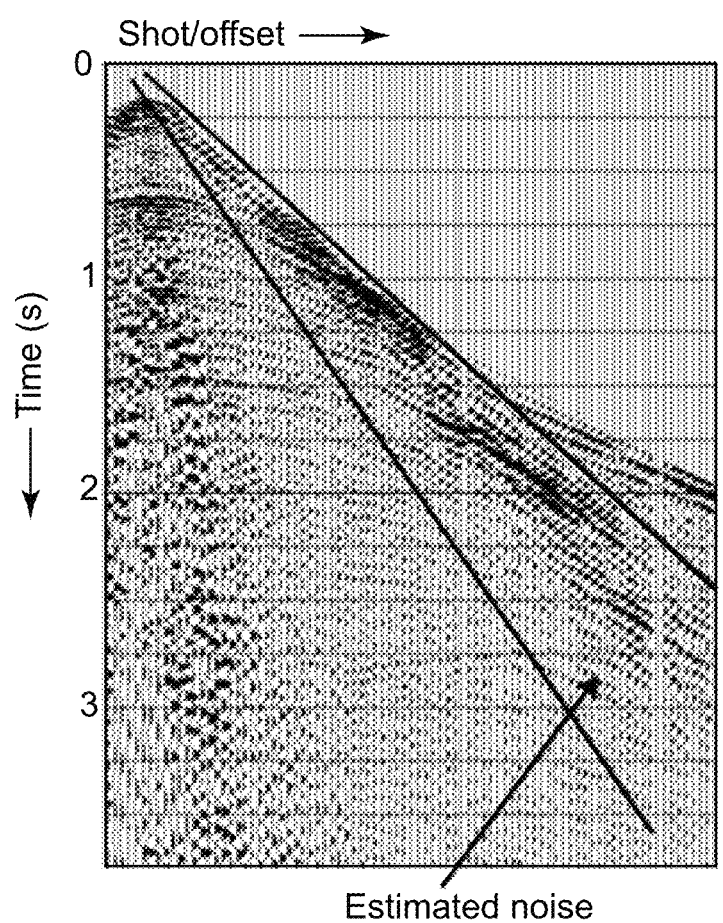
FIG. 7 illustrates seismic data which is an overlap of signal and coherent non-orthogonal noise.
Figure 8:
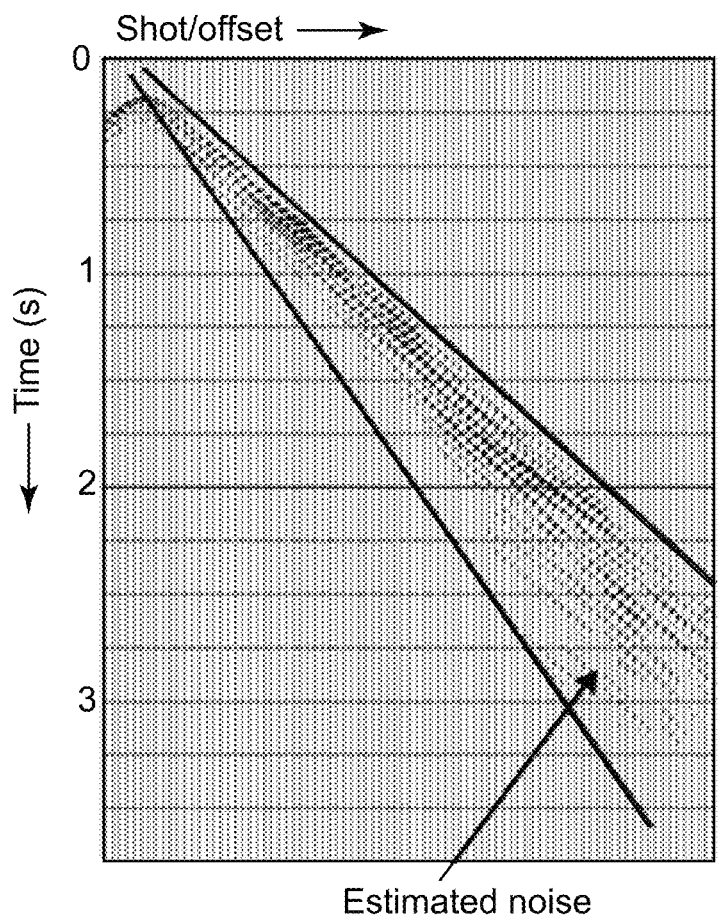
FIG. 8 illustrate the estimated after applying rank reduction and dip filtering, according to an exemplary embodiment.

A dip filtering applied on the estimated noise may further remove the residual signal. FIG. 7 illustrates data including the signal data and coherent non-orthogonal noise. The velocity of the coherent noise is different from the velocity of the signal data. Therefore, the dip filtering may be used to further separate the signal data and the coherent noise. FIG. 8 illustrates the estimated noise after rank reduction and dip filtering.

Since the noise is stronger than the signal data, the dip-filtered estimated noise may be further enhanced by performing a least square matching filter of the dip-filtered estimated noise and the seismic data. For example, if seismic data (D) is a sum of signal data (S) and noise (N), D=S+N, and the dip-filtered estimated noise is N', a least square filter matches N and N' by minimizing a norm (e.g., and L2 norm) of $\|D - WN'\|$, where W is a matching operator. The enhanced dip-filtered estimated noise may be then used to extract the signal data from the seismic data.

The above-described data processing steps (i.e., estimating the noise assuming that coherent noise corresponds to largest singular values, followed by performing dip filtering to further remove signal leaked into estimated noise, further separated using dip filtering, and enhancing the dip-filtered estimated noise based on a least square matching with the seismic data) may be performed on the grouped data as well as on the whole set of data.

These seismic data processing steps are repeated for all the frequencies, followed by the application of an inverse Fourier transform to convert the data from the frequency domain to the time domain, if the signal data is output in time domain.

Thus, in order to overcome variability of noise in spatial and temporal domains, irregular geometry and bandwidth of noise, methods according to some embodiments use an adaptive rank reduction noise filter in temporal and spatial windows. The characteristics of noise, namely, velocity and strength at a given trace, depend on the distance from the shot point.

In 3D data, the noise in the receiver line closer to a shot point is generally stronger than the noise in a receiver line farther from the shot point (i.e., the noise varies spatially from receiver line to receiver line). In order to overcome this spatial variation, the seismic data used to generate the block Hankel matrix may be re-ordered to group shot gathers with similar propagation paths (i.e., a modified shot order). When using this modified data ordering, the noise between neighboring shot gathers is considered stationary. Thus, in order to improve the noise estimation, a 3D gather (f-xy) is formed for each frequency by considering a range of neighboring shots from within the modified shot order set.

In addition, the range of frequencies over which noise is estimated can be varied depending on bandwidth of noise. The criteria to model dominant dip/s also enable aliased noise to be estimated. Further, adaptive subtraction may be performed to optimize the noise estimation.

Figure 9:
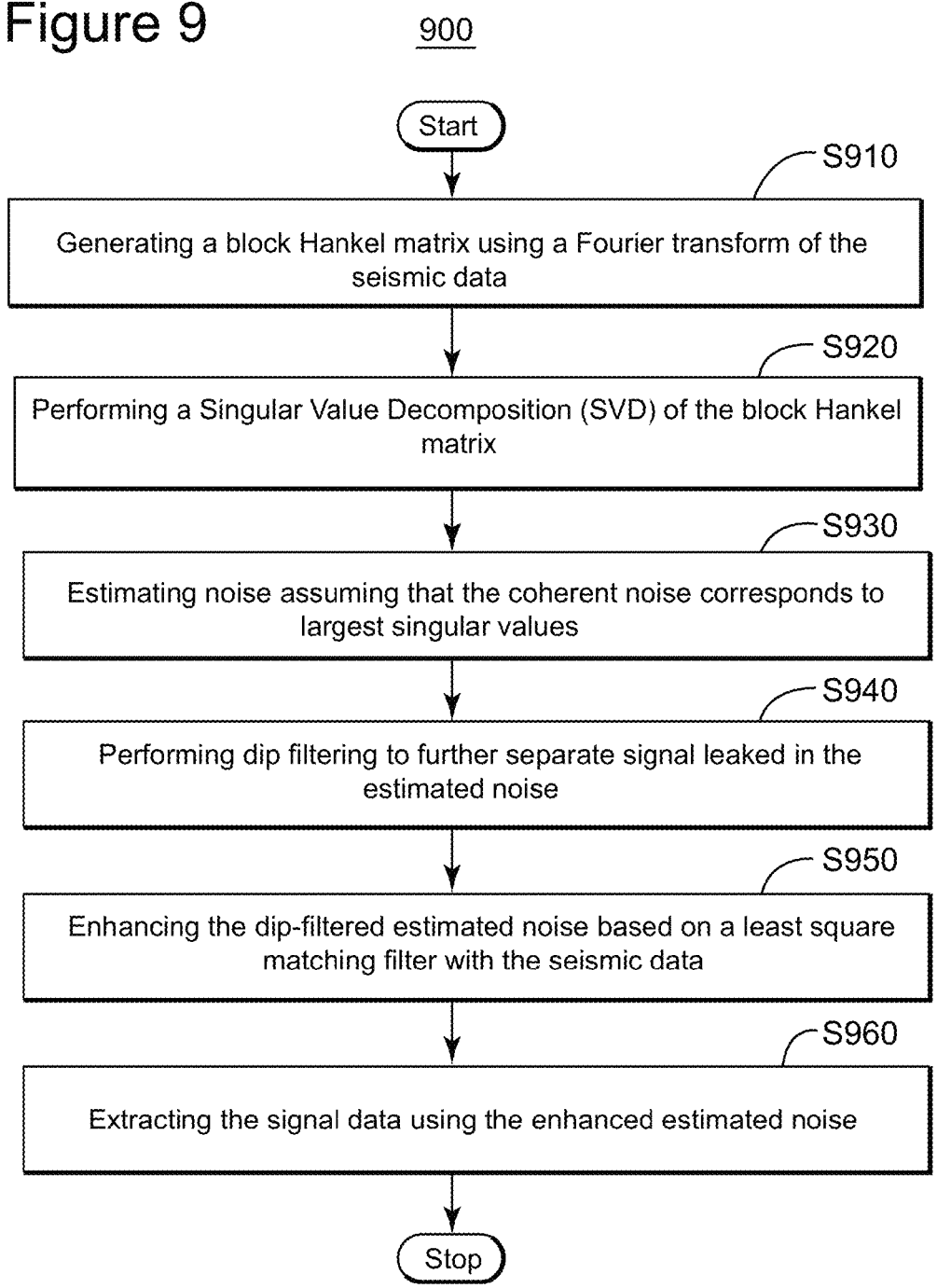
FIG. 9 is a flow chart of a method for seismic data processing, according to another exemplary embodiment.

A flow chart of a method 900 for seismic data processing, according to another exemplary embodiment is illustrated in FIG. 9. The method 900 includes generating a block Hankel matrix using a Fourier transform of the seismic data, at S910, performing SVD of the block Hankel matrix, at S920, estimating noise assuming that coherent noise corresponds to largest singular values corresponds to largest singular values, at S930, performing dip filtering to further separate noise leaked in data extracted using the estimated noise, and generating a noise model based on the estimated noise and noise further separated using dip filtering at S950. The noise model is further enhanced based on a least square matching filter of the noise model and the seismic data, at S960. The signal data is extracted using the enhanced noise model, at S970. The extracted signal data may be output or stored to be used for imaging the subsurface.

Figure 10:
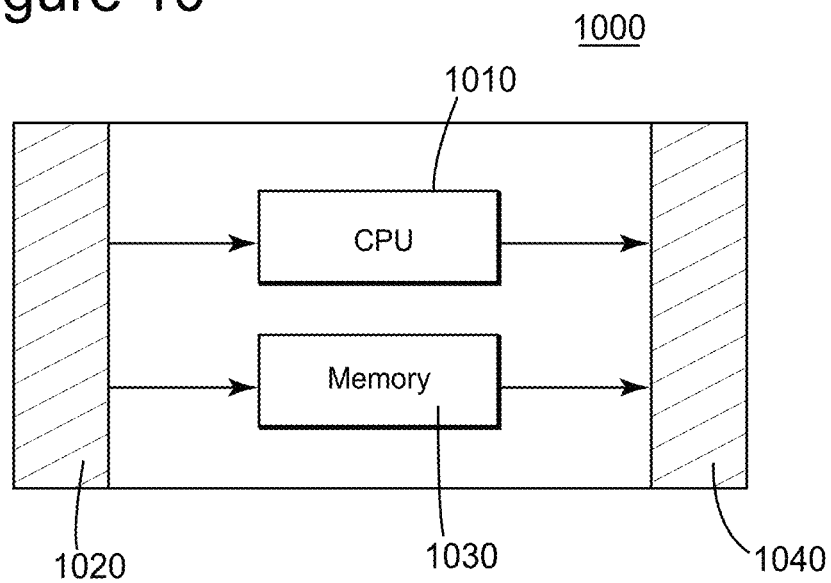
FIG. 10 is a schematic diagram of an apparatus for seismic data processing, according to an exemplary embodiment.

The above methods may be implemented into an apparatus, e.g., a computer, in software or a combination thereof. A schematic diagram of such an apparatus 1000 is illustrated in FIG. 10. The apparatus 1000 includes a processor 1010, an input-output interface 1020, a memory 1030 and a display 1040. The processor 1010 is configured to perform seismic data processing as discussed above. The input-output interface 1020 is configured to receive seismic data either directly from the seismic detectors or from a data storage device that is located outside the apparatus 1000. The memory 1030 is configured to non-transitorily store executable codes which, when executed by the processor 1010, make the processor perform seismic data processing of the seismic data (e.g., method 200 or 900). The display 1040 may be used to display images of the subsurface structure generated during or after the seismic data processing. The apparatus 1000 may include other components as known by those skilled in the art. Being programmed to perform the seismic data processing according to various methods discussed above, the apparatus 1000 is a dedicated equipment not a general-use computer.

Adaptive and non-adaptive rank reduction filters were compared using simulated (synthetic) data. A non-adaptive rank reduction filter means that rank reduction was performed to separate the dominant dip. The simulated data consisted of a strong dip (i.e., simulating coherent noise) and two weaker dips (e.g., corresponding to signal data with no random noise) as illustrated in FIG. 11A, where x-axis represents offset and y-axis represents time. When applying the non-adaptive rank reduction filter (rank 1), the dominant dip was separated but the stronger of the two weak dips leaked into the estimate as seen in FIG. 11B, because the dips are not orthogonal. The difference between the graph in FIG. 11A and the graph in 11B is shown in FIG. 11C. When applying the adaptive rank reduction filter to the same data, the leakage from other dips is no longer present as shown in FIG. 11D. The difference between simulated data (i.e., the graph in FIG. 11A) and the output of the adaptive rank reduction filter (i.e., the graph in Figure E) is shown in FIG. 11E.

A method according to an exemplary embodiment including adaptive rank reduction filter was applied to remove near-surface reverberations found in real data. FIG. 12A illustrates seismic data before adaptive rank reduction filter, where x-axis represents offset and y-axis represents time. The near-surface reverberations (which are source-generated) have different velocities and are stronger than the signal, thus masking the signal underneath. Further, the coherent noise and signal frequencies overlap considerably and noise is aliased (see in particular the polygonal highlighted area). Unlike ground roll, the near-surface reverberation noise affects most offsets and frequencies. If the zone of interest lies within the noise cone, noise must be removed to obtain reliable signal amplitudes.

Figure 12B:
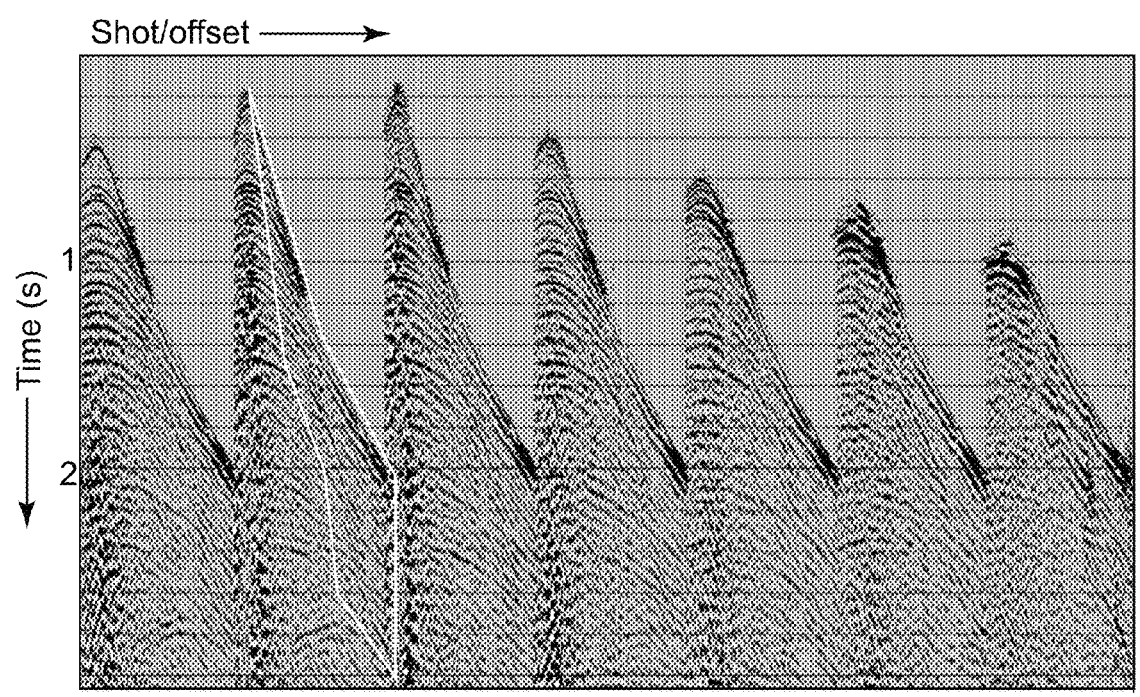
Figure 12C:
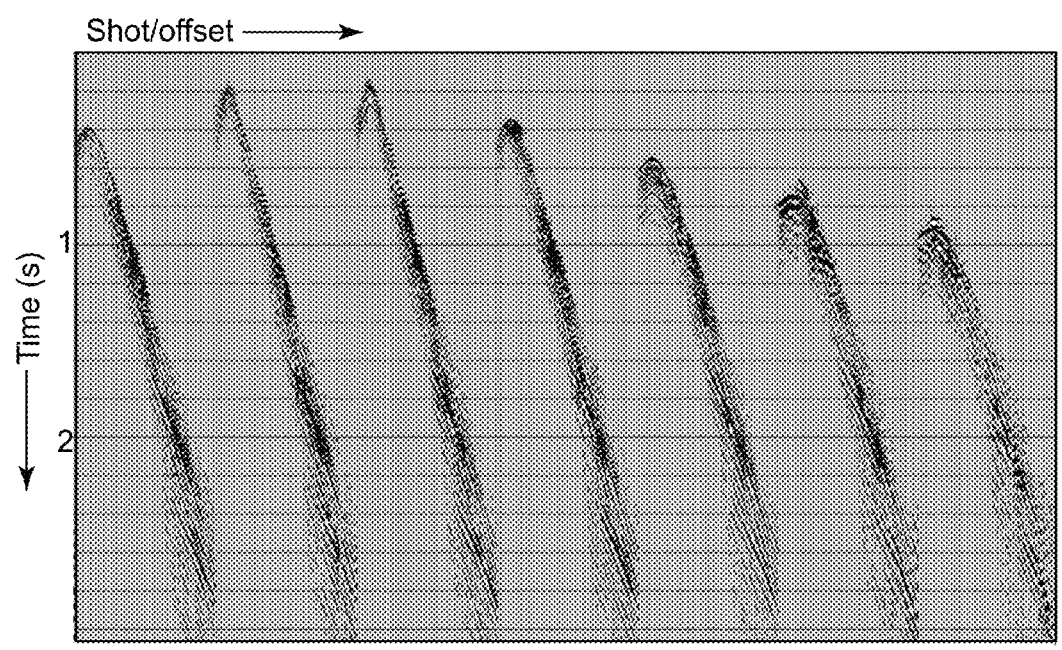

The method including adaptive rank reduction filter, was used to estimate and remove the near-surface reverberations. FIG. 12B illustrates the seismic data reconstructed after applying the method including adaptive rank reduction filtering, and FIG. 12C illustrates the difference between the graph in FIG. 12A and the graph in 12B, i.e., the coherent noise due to near-surface reverberations.

Figure 13:
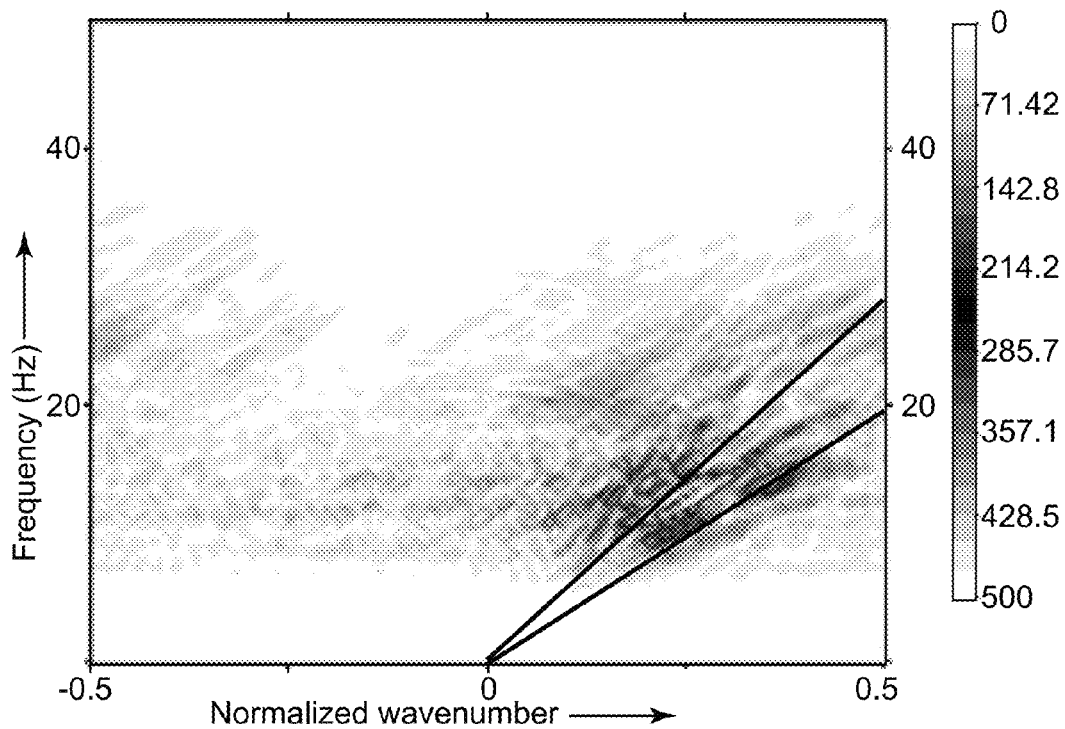
FIG. 13 is a frequency versus wave number graph of the seismic data prior to applying the adaptive noise subtraction.
Figure 14:
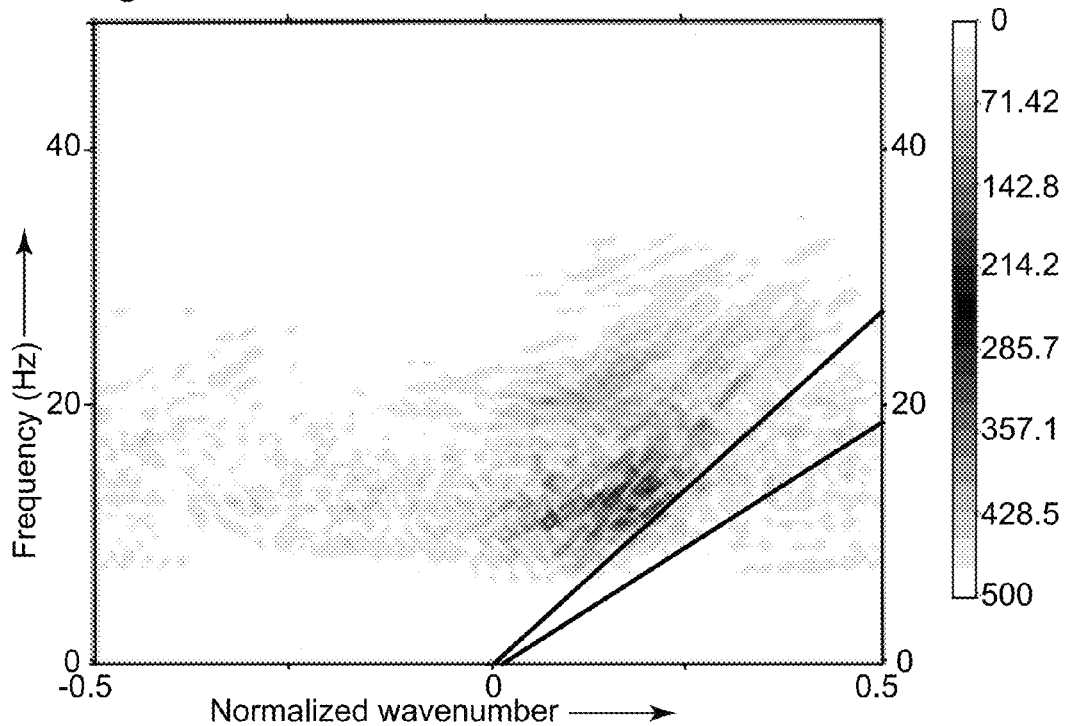
FIG. 14 is a frequency versus wave number graph of the signal data obtained by applying the adaptive noise subtraction, according to an exemplary embodiment.

Another manner of emphasizing the efficiency of the methods including adaptive noise subtraction is by looking at two-dimensional plots of frequency versus wave number. FIG. 13 represents the seismic data prior to applying the adaptive noise subtraction and FIG. 14 represents the signal data obtained by applying the adaptive noise subtraction, the portion between the lines on these frequency/wave number plots indicating the zone where coherent noise is mostly present.

The disclosed exemplary embodiments provide an apparatus and a method for seismic data processing. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for processing, on a computer, seismic data carrying information about subsurface, the method comprising:
   receiving the seismic data recorded by detectors arranged on receiver lines;
   splitting the seismic data into groups, each group including subsets of seismic data for which a distance from a shot point where a seismic wave is generated to a receiver line is within a predetermined range for the group;
   extracting signal data by subtracting noise from the seismic data for each group of seismic data, wherein the extracting includes generating a block Hankel matrix using a Fourier transform of the seismic data pertaining to the group, performing a Singular Value Decomposition (SVD) of the block Hankel matrix, and estimating the noise assuming that coherent noise corresponds to largest singular values; and
   outputting the signal data useable to generate an image of the subsurface,
   wherein the extracting of the signal data for each group further includes performing dip filtering to further separate signal leaked in the estimated noise, and enhancing the dip-filtered estimated noise based on a least square matching filter with the seismic data, the enhanced dip-filtered estimated noise being then used to extract the signal data.

2. The method of claim 1, wherein the groups include at least two groups:
   a first group for which the distance is smaller than or equal to a threshold distance, and
   a second group for which the distance is larger than the threshold distance.

3. The method of claim 1, further comprising:
   acquiring the seismic data using a land seismic data acquisition system having plural substantially parallel receiver lines, shot points being intercalated between the receiver lines,
   wherein the groups include a first group with seismic data corresponding to first receiver lines that are closest to a respective shot point, a second group with seismic data corresponding to second receiver lines that are adjacent to the first receiver lines but not to the respective shot point, and i-th groups corresponding to i-th receiver lines that are adjacent to (i−1)-th receiver lines and farther away from the respective shot point than the (i−1)-th receiver lines, where i is between 3 and a number of receiver lines in a patch of active detectors corresponding to the respective shot point.

4. The method of claim 1, wherein the generating of the block Hankel matrix and the Singular Value Decomposition (SVD) of the block Hankel matrix are performed separately for each frequency.

5. The method of claim 1, wherein the shot point position is located in-between the receiver lines, which are substantially parallel to one-another.

6. The method of claim 1, wherein the seismic data that is split into groups is related to plural shots.

7. The method of claim 1, further comprising:
   generating an image of the subsurface.

8. An apparatus for processing seismic data carrying information about subsurface, the apparatus comprising:

an interface configured to receive the seismic data and/or to transmit signal data; and a data processing unit configured to split the seismic data in groups, each group including subsets of seismic data for which a distance from a shot point where a seismic wave is generated to a receiver line is within a predetermined range for the group;

to extract signal data by subtracting noise from the seismic data for each group of seismic data by generating a block Hankel matrix using a Fourier transform of the seismic data pertaining to the group, performing a Singular Value Decomposition (SVD) of the block Hankel matrix, and estimating the noise assuming that coherent noise corresponds to largest singular values; and to output the signal data useable to generate an image of the subsurface, wherein, when extracting the signal data the data processing unit is configured to perform dip filtering to further separate signal leaked in the estimated noise, and to enhance the dip-filtered estimated noise by performing a least square matching filter with the seismic data, the enhanced dip-filtered estimated noise being then used to extract the signal data.

9. The apparatus of claim 8, wherein the groups include at least two groups:
a first group for which the distance is smaller than or equal to a threshold distance, and
a second group for which the distance is larger than the threshold distance.

10. The apparatus of claim 8, wherein
the seismic data has been acquired using a land seismic data acquisition system having plural substantially parallel receiver lines, shots being fired from positions along shot lines intercalated between the receiver lines, and
the groups include a first group with seismic data corresponding to first receiver lines that are closest to a respective shot point, a second group with seismic data corresponding to second receiver lines that are adjacent to the first receiver lines but not to the respective shot point, and i-th groups corresponding to i-th receiver line that are adjacent to (i−1)-th receiver lines and farther away from the respective shot point than the (i−1)-th receiver lines, where i is between 3 and a number of receiver lines in a patch of active receiver lines corresponding to the shot point.

11. The apparatus of claim 8, wherein the data processing unit performs the generating of the block Hankel matrix and the Singular Value Decomposition (SVD) of the block Hankel matrix separately for each frequency.

12. The apparatus of claim 8, the shot point position is located in-between the receiver lines, which are substantially parallel to one-another.

13. The apparatus of claim 8, wherein the seismic data split by the data processing unit is related to plural shots.

14. The apparatus of claim 8, further comprising a display configured to display images of the subsurface structure.

15. A computer readable storage medium non-transitorily storing executable codes which when executed on a computer make the computer to perform a method for processing seismic data carrying information about subsurface, the method comprising:

splitting the seismic data into groups, each group including subsets of seismic data for which a distance from a shot point to a receiver line is within a predetermined range for the group;

extracting signal data by subtracting noise from the seismic data for each group of seismic data, wherein the extracting includes generating a block Hankel matrix using a Fourier transform of the seismic data pertaining to the group, performing a Singular Value Decomposition (SVD) of the block Hankel matrix, and estimating the noise assuming that coherent noise corresponds to largest singular values; and outputting the signal data useable to generate an image of the subsurface, wherein the extracting of signal data for each group further includes performing dip filtering to further separate signal leaked in the estimated noise, and enhancing the dip-filtered estimated noise based on a least square matching filter with the seismic data, the enhanced dip-filtered estimated noise being then used to extract the signal data.

16. The computer readable medium of claim 15, wherein the groups include at least two groups:
a first group for which the distance is smaller than or equal to a threshold distance, and
a second group for which the distance is larger than the threshold distance.

17. The computer readable medium of claim 15, wherein
the seismic data has been acquired using a land seismic data acquisition system having plural substantially parallel receiver lines, shot points being intercalated between the receiver lines, and
the groups include a first group of seismic data corresponding to first receiver lines that are closest to a respective shot point, a second group of seismic data corresponding to second receiver lines that are adjacent to the first receiver lines but not to the respective shot point, and i-th groups of seismic data corresponding to i-th receiver lines that are adjacent to (i−1)-th receiver lines and farther away from to the respective shot point than the (i−1)-th receiver lines, where i is between 3 and a number of the receiver lines in a patch of active receiver lines corresponding to the respective shot point.

18. The computer readable medium of claim 15, wherein the generating of the block Hankel matrix and the Singular Value Decomposition (SVD) of the block Hankel matrix are performed separately for each frequency.

19. The computer readable medium of claim 15, wherein the shot point position is located in-between the receiver lines, which are substantially parallel to one-another.

20. The computer readable medium of claim 15, wherein the seismic data that is split into groups is related to plural shots.

* * * * *